(12) United States Patent
Osaka

(10) Patent No.: US 7,116,561 B2
(45) Date of Patent: Oct. 3, 2006

(54) RESONANT POWER SOURCE APPARATUS

(75) Inventor: Syohei Osaka, Niiza (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 11/320,721

(22) Filed: Dec. 30, 2005

(65) Prior Publication Data

US 2006/0146580 A1    Jul. 6, 2006

(30) Foreign Application Priority Data

Jan. 6, 2005    (JP) .............................. 2005-001505

(51) Int. Cl.
*H02M 3/335*    (2006.01)
(52) U.S. Cl. ..................................... 363/21.02; 363/97
(58) Field of Classification Search ................ 363/15, 363/16, 21.01, 21.02, 95, 97
See application file for complete search history.

(56) References Cited

U.S. PATENT DOCUMENTS 6,366,476 B1 *   4/2002   Yasumura ................ 363/21.02
6,370,043 B1 *   4/2002   Yasumura ................ 363/21.02

FOREIGN PATENT DOCUMENTS

JP          7-63216         7/1995

* cited by examiner

*Primary Examiner*—Adolf Berhane
(74) *Attorney, Agent, or Firm*—Oblon, Spivak, McClelland, Maier & Neustadt, P.C.

(57) ABSTRACT

A resonant power source apparatus has a series circuit of switching elements QL and QH connected to ends of a DC power source, a series circuit of a current-resonant capacitor, a resonant reactor, and a primary winding of a transformer connected to ends of the switching element QL or QH, a rectifying/smoothing circuit to rectify and smooth a voltage of a secondary winding, a pulse ratio controller to alternately turn on/off the switching elements QL and QH according to an output voltage from the rectifying/smoothing circuit, and a resonant period detector to detect a period during which energy is transmitted from the primary side to the secondary side of the transformer. The pulse ratio controller determines an ON period of the switching element according to a signal from the resonant period detector and an ON period of the switching element QH according to a signal from the rectifying/smoothing circuit.

9 Claims, 9 Drawing Sheets t21  t22  t23 ton1  ton2  ton3 t24  t25  t26

RESONANT POWER SOURCE APPARATUS

BACKGROUND OF THE INVENTION

1. Field of the Invention

The present invention relates to a resonant power source apparatus that is highly efficient, low noise, and inexpensive.

2. Description of the Related Art

FIG. 1 shows a current-resonant power source apparatus according to a related art. In FIG. 1, ends of a DC power source 1 are connected to a series circuit consisting of a MOSFET as a switching element QH and a MOSFET as a switching element QL. An end of the switching element QH is connected to a positive electrode of the DC power source 1. An end of the switching element QL is connected to a negative electrode of the DC power source 1.

The switching element QH is connected in parallel with a diode D2. The switching element QL is connected in parallel with a diode D1. The switching element QH is connected in parallel with a voltage-resonant capacitor Crv.

The voltage-resonant capacitor Crv is connected in parallel with a current-resonant circuit consisting of a current-resonant capacitor Cri, a resonant reactor Lr, and a primary winding P1 of a transformer T. The voltage-resonant capacitor Crv, current-resonant capacitor Cri, resonant reactor Lr, and the primary winding P1 of the transformer T form a resonant circuit.

The resonant reactor Lr may be a leakage inductance of the transformer T. The voltage-resonant capacitor Crv may be a parasitic capacitance of the switching element QH. The diode D2 connected in parallel with the switching element QH may be a parasitic diode of the switching element QH. The diode D1 connected in parallel with the switching element QL may be a parasitic diode of the switching element QL.

The primary winding P1 and a secondary winding S of the transformer T are wound so as to generate in-phase voltages. The secondary winding S of the transformer T is connected to a rectifying/smoothing circuit consisting of a rectifier D0 and a smoothing capacitor Co. The rectifying/smoothing circuit rectifies and smoothes a voltage (on/off-controlled pulse voltage) induced by the secondary winding S of the transformer T, to provide a DC output for a load 4.

Both ends of the smoothing capacitor Co are connected to an output voltage detector 5. The output voltage detector 5 detects an output voltage of the smoothing capacitor Co, generates an error voltage signal indicative of a difference between the detected voltage and a reference voltage, and supplies the error voltage signal through a photocoupler PC to a pulse ratio controller (PRC) 2. Based on the error voltage signal, the pulse ratio controller 2 generates a pulse ratio control signal to control the ON duty ratio of a pulse. The pulse ratio control signal is used by a high-side driver 3 to alternately turn on/off the switching elements QH and QL in such a way as to maintain a constant voltage for the load 4. To alternately turn on/off the switching elements QH and QL, voltage is applied to gates of the switching elements QH and QL.

Operation of the resonant power source apparatus of the above-mentioned configuration will be explained with reference to a timing chart of FIG. 2.

The ON period of the switching element QL is set to a given time width that involves a proper margin with respect to a half period of the resonance frequency of the resonant circuit consisting of the current-resonant capacitor Cri and resonant reactor Lr. The ON period of the switching element QH is determined according to the error voltage signal from the output voltage detector 5.

In FIG. 2, VQL is a terminal voltage of the switching element QL, IQL is a current passing through the switching element QL, IP1 is a current passing through the primary winding P1, VS is a terminal voltage of the secondary winding S, and ID0 is a current passing through the rectifier D0. The resonant reactor Lr is sufficiently smaller than the exciting inductance Lp of the primary winding P1, and the voltage-resonant capacitor Crv is sufficiently smaller than the current-resonant capacitor Cri.

In a period T1, the switching element QH is OFF, and the switching element QL changes from ON to OFF. Energy accumulated in the resonant reactor Lr and the exciting inductance Lp of the transformer T produces the resonant current IP1 that is passed from the resonant reactor Lr and exciting inductance Lp to the voltage-resonant capacitor Crv, current-resonant capacitor Cri, and primary winding P1. The exciting inductance Lp of the transformer T, resonant reactor Lr, and voltage-resonant capacitor Crv resonate to discharge the voltage-resonant capacitor Crv. As a result, a voltage VQH decreases and the voltage VQL increases.

In a period T2, the switching elements QL and QH are OFF. The voltage-resonant capacitor Crv completes the discharging, the voltage VQH is zero, and the voltage VQL is equal to a terminal voltage of the DC power source 1. The resonant current IP1 continuously passes in a clockwise direction through a path passing along the resonant reactor Lr, diode D2, current-resonant capacitor Cri, and primary winding P1. When the switching element QH is turned on, a period T3 starts. In the period T3, the switching element QH is ON and the switching element QL is OFF. The current IP1 decreases and continuously passes in a clockwise direction through a path passing along the resonant reactor Lr, switching element QH, current-resonant capacitor Cri, and primary winding P1. When this current becomes zero, a period T4 starts.

In the period T4, the switching element QH is ON and the switching element QL is OFF. The direction of the current IP1 is reversed. Namely, the resonant current IP1 passes in a counterclockwise direction through the primary winding P1 current-resonant capacitor Cri, switching element QH, and resonant reactor Lr, to reset the magnetic flux of the transformer T.

In the periods T1 to T4, the exciting inductance Lp of the transformer, the resonant reactor Lr, and the current-resonant capacitor Cri resonate to pass the current IP1.

In a period T5, the switching element QH turns off and the switching element QL is OFF. The current IP1 of the primary winding P1 of the transformer T is a resonant current that passes in a counterclockwise direction through the path passing along the primary winding P1, current-resonant capacitor Cri, voltage-resonant capacitor Crv, reactor Lr, and primary winding P1. The exciting inductance Lp of the transformer T, the reactor Lr, and the voltage-resonant capacitor Crv resonate to charge the voltage-resonant capacitor Crv, increase the voltage VQH, and decrease the voltage VQL.

In a period T6, the switching elements QH and QL are OFF. The voltage-resonant capacitor Crv is charged to the voltage of the DC power source 1, the voltage VQH becomes equal to the voltage of the DC power source 1, and the voltage VQL becomes zero. As a result, the resonant current IP1 continuously passes in a counterclockwise direction through the primary winding P1, current-resonant capacitor Cri, DC power source 1, diode D1, and reactor Lr.

In a period T7, the switching element QL turns on and the switching element QH is OFF. The resonant current IP1 continuously passes in a counterclockwise direction through the path passing along the primary winding P1, current-resonant capacitor Cri, DC power source 1, switching element QL, and resonant reactor Lr. In the periods T5 to T7, the exciting inductance Lp of the transformer T, the resonant reactor Lr, and the current-resonant capacitor Cri resonate to pass the current IP1 (the current IQL of the switching element QL).

In a period T8, the switching element QL is ON and the switching element QH is OFF. The current IP1 continuously passes in the counterclockwise direction through a path passing along the primary winding P1, current-resonant capacitor Cri, DC power source 1, switching element QL, and resonant reactor Lr. The current ID0 starts to pass through the rectifier D0 on the secondary side.

In a period T9, the switching element QL is ON and the switching element QH is OFF. The current IP1 from the DC power source 1 passes through a path passing along the current-resonant capacitor Cri, primary winding P1, and switching element QL. The current ID0 continuously passes through the rectifier D0 on the secondary side.

In the periods T8 and T9, the resonant reactor Lr and current-resonant capacitor Cri resonate to pass the current IP1 (equal to the current IQL of the switching element QL). In the periods T8 and T9, energy is transmitted from the primary winding P1 to the secondary winding S of the transformer T. At this time, the current ID0 passed from the primary side to the secondary side increases along a curve as time passes. At a certain point, the current ID0 starts to decrease and becomes zero after a resonant period t1 (corresponding to the periods T6 to T9). The energy transferred to the secondary side is rectified and smoothed through the rectifier D0 and smoothing capacitor Co, so that DC power is supplied to the load 4.

In a period T10, the switching element QL is ON and the switching element QH is OFF. The current IP1 (equal to the current IQL of the switching element QL) provided by the DC power source 1 passes through the path passing through the current-resonant capacitor Cri, primary winding P1, resonant reactor Lr, and switching element QL. The current ID0 stops. In the period T10, the exciting inductance Lp of the transformer T, the resonant reactor Lr, and the current-resonant capacitor Cri resonate to pass the current IP1 (equal to the current IQL of the switching element QL). After the period T10 (corresponding to a period t2 determined by an oscillation frequency or a duty ratio), the switching element QL turns off and the switching element QH turns on to start a reset period t3 (corresponding to the periods T1 to T5).

If the switching element QL turns off in the period t1 for transferring energy to the secondary side, no zero-current switching is carried out, and therefore, the rectifier D0 causes recovery noise to increase the switching noise and switching loss of the switching element QL.

To avoid this problem, the ON period of the switching element QL must have a sufficient margin to cover a variation in the period t1 due to variations of the current-resonant capacitor Cri and resonant reactor Lr. Namely, the ON period of t1+t2 must be sufficiently long.

If the period t2 is too long, an effective value of the current IP1 increases to increase a loss. In addition, a period for applying voltage to the primary side of the transformer T is extended to increase a loss in the transformer T. The loss is irrelevant to an original purpose of supplying energy to the secondary side, and therefore, is undesirable. In addition, the loss deteriorates the efficacy of the power source apparatus.

To solve the problem, Japanese Examined Patent Application Publication No. JP7-63216 (Japanese Patent No. 2042563) discloses a series resonant converter. FIG. 3 shows the converter. The converter includes a series circuit of two switching elements 102 and 103, a series circuit of two rectifiers 104 and 105, and a series circuit of two capacitors 106 and 107. These series circuits are connected to a DC power source 101. A node between the rectifiers 104 and 105 is connected to a node between the capacitors 106 and 107. The node between the rectifiers 104 and 105 and a node between the switching elements 102 and 103 are connected to a series circuit of a primary winding of a transformer 108 and a reactor 109. A secondary winding of the transformer 108 is connected to a rectifier 110 and an output capacitor 111. A transformer voltage detector 130 detects a voltage on the secondary winding of the transformer 108. A logic circuit 150 compares the output of the transformer voltage detector 130 with drive signals for controlling the switching elements, turns on the switching elements 102 and 103 during a period in which the transformer 108 generates voltage, and turns off the switching elements 102 and 103 after a disappearance of the voltage of the transformer 108.

This series resonant converter zeroes voltage applied to the transformer when a period for supplying energy to the secondary side ends, thereby zeroing voltage induced by the secondary winding.

SUMMARY OF THE INVENTION

The series resonant converter of FIG. 3, however, is complicated because it must have the logic circuit 150 that compares the output of the transformer voltage detector 130 with the drive signals for controlling the switching elements, turns on the switching elements 102 and 103 during a period in which the transformer 108 generates voltage, and turns off the switching elements 102 and 103 after a disappearance of the voltage of the transformer 108.

On the other hand, the power source apparatus of FIG. 1 has a problem that the voltage VP1 of the primary winding P1 of the transformer T does not reach zero at the end of the period t1, and therefore, simply providing an auxiliary winding for detecting a voltage is insufficient to correctly detect a period during which energy is supplied from the primary side to the secondary side.

Detecting the energy supplying period with the use of a voltage on the secondary winding needs a complicated circuit because a signal detected on the secondary side must be insulated and transmitted to a controller that is on the primary side.

According to the present invention, a resonant power source apparatus that is highly efficient, low noise, inexpensive, simple, and capable of detecting a period during which energy is transferred from a primary side to a secondary side of a transformer and reducing switching noise and switching loss.

A first technical aspect of the present invention provides a resonant power source apparatus having a first series circuit of first and second switching elements connected to ends of a DC power source, or to output ends of an input circuit for rectifying an AC voltage of an AC power source; a second series circuit of a resonant capacitor, a resonant reactor, and a primary winding of a transformer, connected to ends of one of the first and second switching elements; a rectifying/smoothing circuit configured to rectify and smooth a voltage of a secondary winding of the transformer; a controller configured to alternately turn on/off the first and second switching elements according to an output voltage from the rectifying/smoothing circuit; and a resonant period detector configured to detect a period during which energy is transmitted from the primary side to the secondary side of the transformer. The controller determines an ON period of the first switching element according to a signal from the resonant period detector and an ON period of the second switching element according to a signal from the rectifying/smoothing circuit.

A second technical aspect of the present invention provides the resonant power source apparatus with a mask unit configured to disable the signal supplied from the resonant period detector to the controller for a predetermined period after one of the first and second switching elements is turned on to transmit energy from the primary side to the secondary side of the transformer.

DESCRIPTION OF THE PREFERRED EMBODIMENT

Resonant power source apparatuses according to embodiments of the present invention will be explained in detail with reference to the drawings.

First Embodiment

Figure 1:
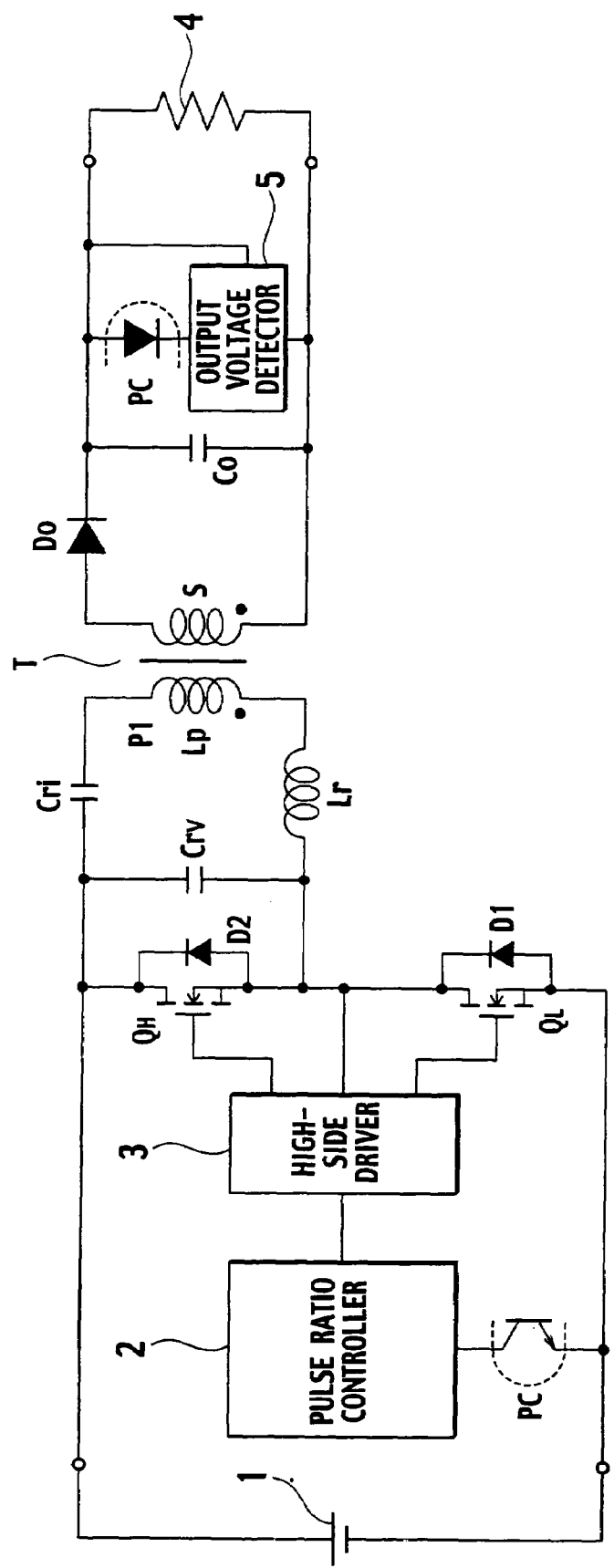
FIG. 1 is a circuit diagram showing a resonant power source apparatus according to a related art.
Figure 4:
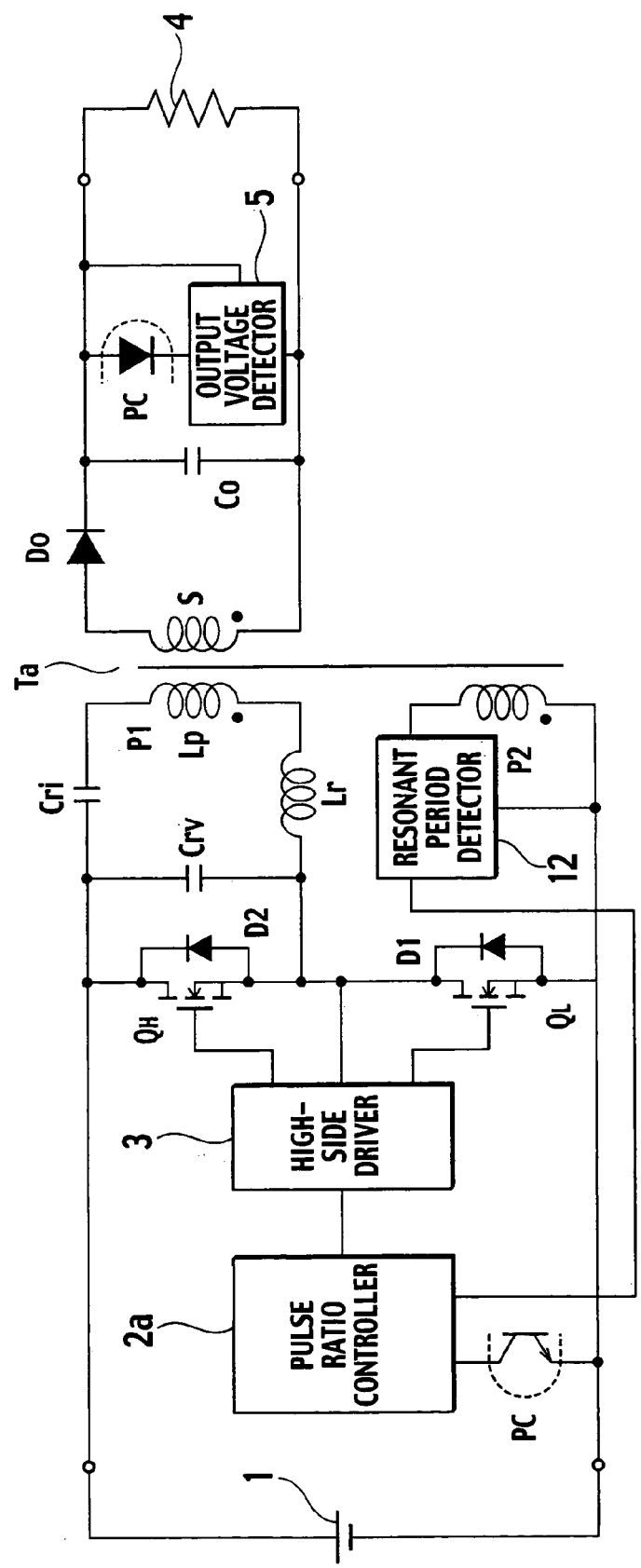
FIG. 4 is a circuit diagram showing a resonant power source apparatus according to a first embodiment of the present invention.

FIG. 4 is a circuit diagram showing a resonant power source apparatus according to the first embodiment of the present invention. Compared with the resonant power source apparatus of FIG. 1, the resonant power source apparatus of FIG. 4 additionally has an auxiliary winding P2 and a resonant period detector 12.

The auxiliary winding P2 is provided for a transformer Ta and is tightly coupled with a secondary winding S. The resonant period detector 12 detects, according to a voltage of the auxiliary winding P2 of the transformer Ta, a period during which energy is transmitted from the primary side to the secondary side of the transformer Ta and provides a resonant period detection signal to a pulse ratio controller 2a.

The pulse ratio controller (PRC) 2a receives a detected voltage from an output voltage detector 5 and carries out pulse ratio control to alternately turn on/off switching elements QL and QH, thereby maintaining a constant voltage for a load 4. The pulse ratio control fixes the OFF width of a switching element and changes the ON width thereof, or fixes the ON width of a switching element and changes the OFF width thereof.

The pulse ratio controller 2a also maintains an ON state for the switching element QL and an OFF state for the switching element QH, during a period of energy being transmitted from the primary side to the secondary side of the transformer Ta, according to the resonant period detection signal received from the resonant period detector 12. The pulse ratio controller 2a determines an ON period of the switching element QL according to the signal from the resonant period detector 12 and an ON period of the switching element QH according to the signal from the output voltage detector 5. The other parts of FIG. 4 are the same as those of FIG. 1, and the same parts are represented with the same reference marks to omit their explanations.

In FIG. 4, a resonant reactor Lr may be a leakage inductance between the primary winding P1 and the secondary winding S of the transformer Ta. A diode D2 connected in parallel with the switching element QH may be a parasitic diode of the switching element QH. A diode D1 connected in parallel with the switching element QL may be a parasitic diode of the switching element QL. A voltage-resonant capacitor Crv connected in parallel with the switching element QH may be a parasitic capacitance of the switching element QH.

Figure 2:
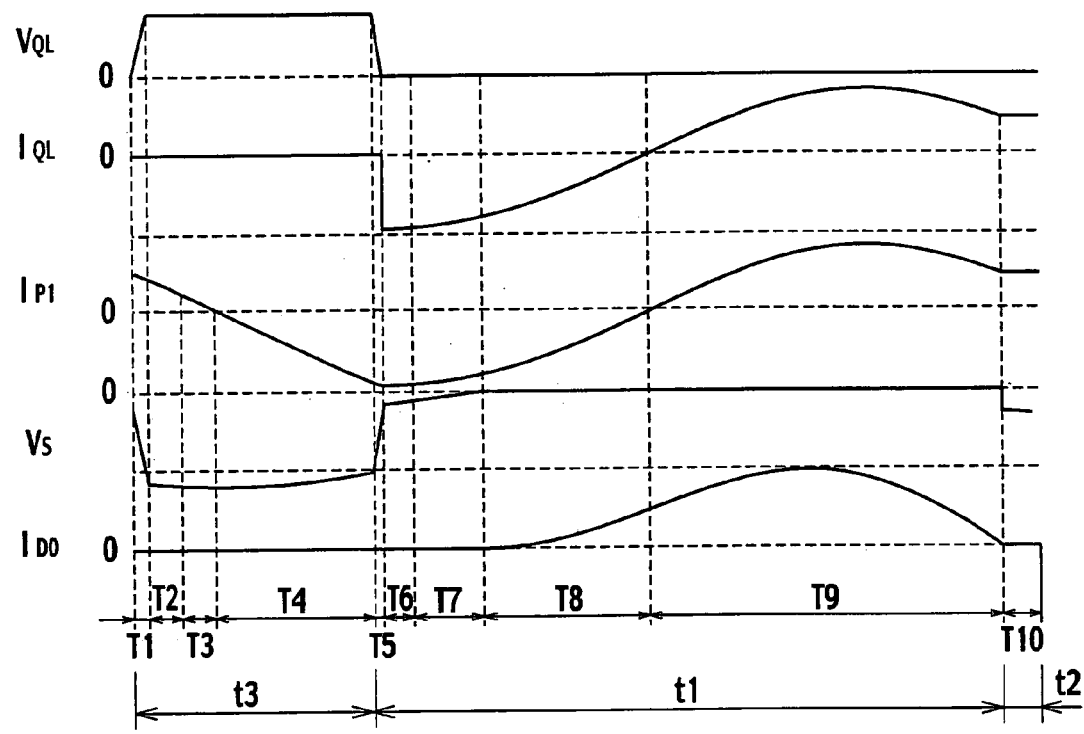
FIG. 2 is a timing chart showing signals at various parts of the resonant power source apparatus of FIG. 1.
Figure 3:
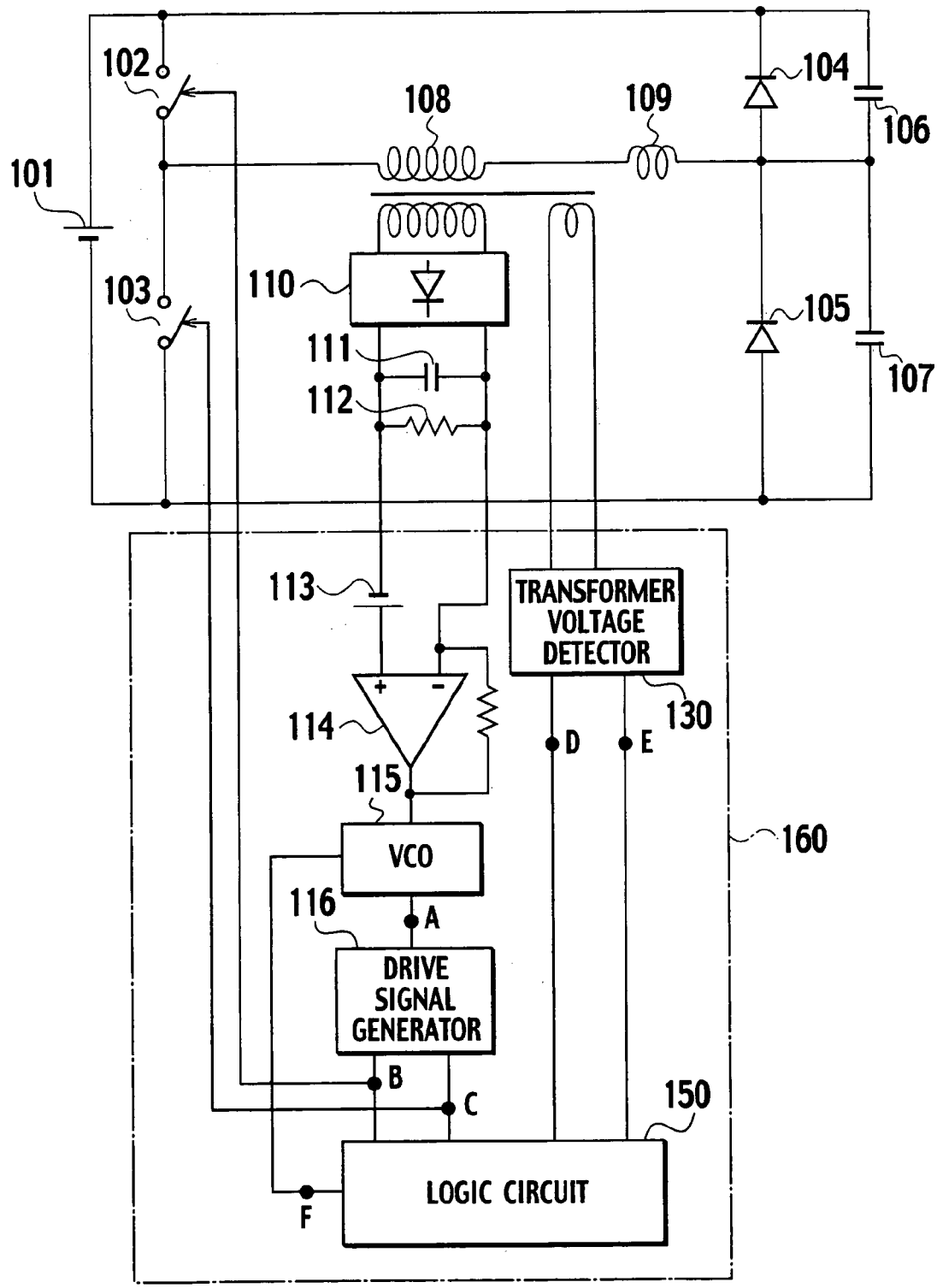
FIG. 3 is a circuit diagram showing a resonant power source apparatus according to another related art.

Operation of the resonant power source apparatus according to the first embodiment will be explained. The operation is basically the same as that of the resonant power source apparatus shown in FIG. 2, and therefore, operation of the auxiliary winding P2 and that of the resonant period detector 12 will be mainly explained with reference to the timing charts of FIGS. 5 and 6.

Figure 5:
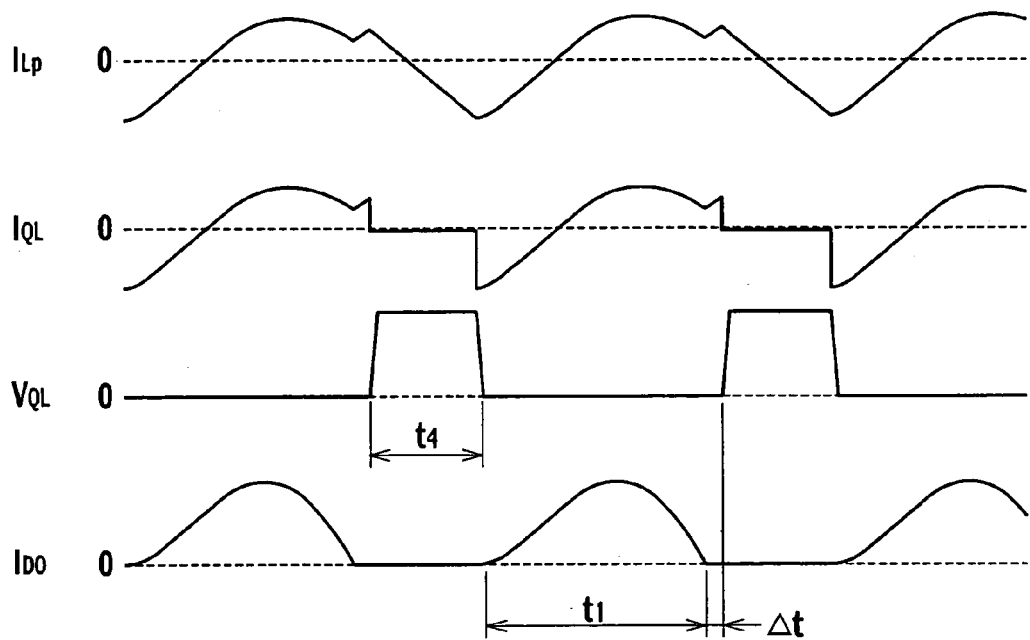
FIGS. 5 and 6 are timing charts showing signals at various parts of the resonant power source apparatus of the first embodiment with different input voltages.
Figure 6:
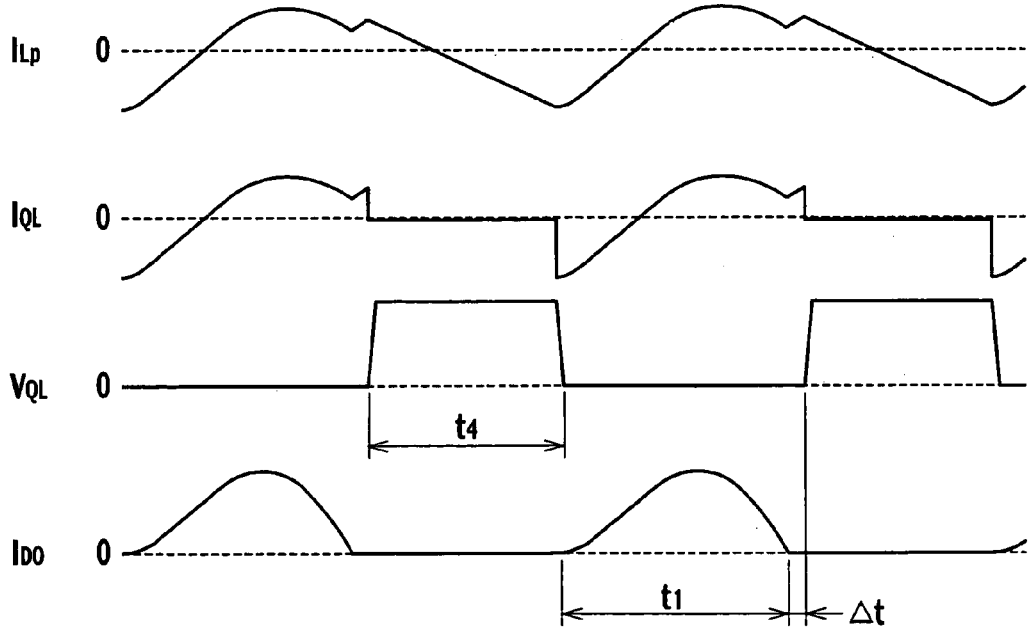

The timing charts of FIGS. 5 and 6 show signals at various parts of the resonant power source apparatus according to the first embodiment with different input voltages. In FIG. 5, a high input voltage is supplied from a DC power source 1, and in FIG. 6, a low input voltage is supplied therefrom.

In FIGS. 5 and 6, ILP is a current passing through the primary winding P1 that forms a resonant circuit, IQL is a current passing through the switching element QL, VQL is a terminal voltage of the switching element QL, and ID0 is a current passing through a rectifier D0.

When the switching element QL is turned on, energy is transmitted from the primary side to the secondary side of the transformer Ta, and a voltage is induced at the secondary winding S of the transformer Ta. A voltage is also generated at the auxiliary winding P2 being tightly coupled with the secondary winding S. According to the voltage of the auxiliary winding P2 of the transformer Ta, the resonant period detector 12 detects a period t1 which starts when the switching element QL is turned on and during energy being transmitted to the secondary side of the transformer Ta. The resonant period detector 12 provides a resonant period detection signal representative of the period t1 to the pulse ratio controller 2a.

According to the resonant period detection signal from the resonant period detector 12, the pulse ratio controller 2a determines an ON period of [t1+Δt] of the switching element QL, turns on the switching element QL only for the ON period of [t1+Δt], and turns off the switching element QL after the ON period of [t1+Δt].

Even if the input voltage from the DC power source 1 varies, the time duration Δt after the end of the period t1 during energy being transmitted to the secondary side of the transformer Ta up to the turn-off timing of the switching element QL is substantially unchanged as shown in FIGS. 5 and 6.

In addition, the pulse ratio controller 2a determines an ON period of the switching element QH according to a signal from the output voltage detector 5, and based on the ON period, maintains a constant output voltage. Comparing FIGS. 5 and 6 with each other, it is understood that a period t4 of the switching element QH being ON is dependent on an input voltage from the DC power source 1. The period t4 is a period in which the switching element QH is ON so that the exciting energy of the primary winding P1 of the transformer Ta accumulates energy in the current-resonant capacitor Cri. In this way, the period t4 changes in response to an input voltage from the DC power source 1, so that a constant voltage is applied to the transformer Ta and so that the power source apparatus maintains a constant output voltage.

Figure 7:
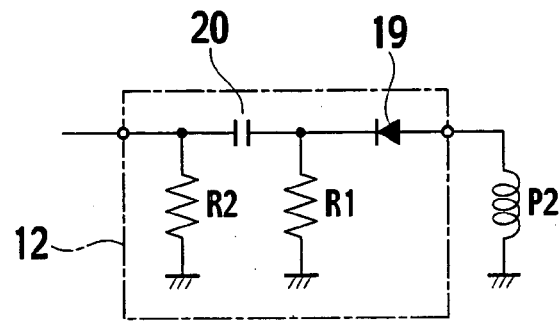
FIG. 7 is a circuit diagram showing an example of a resonant period detector arranged in the resonant power source apparatus of the first embodiment.

FIG. 7 is a circuit diagram showing an example of the resonant period detector 12 arranged in the resonant power source apparatus according to the first embodiment. The resonant period detector 12 of FIG. 7 includes the auxiliary winding P2 tightly coupled with the secondary winding S1 of the transformer Ta, a rectifier 19 connected in series with the auxiliary winding P2, a voltage detection resistor R1 connected in parallel with the series circuit of the auxiliary winding P2 and rectifier 19, and a voltage detection resistor R2 connected in parallel with the voltage detection resistor R1 through a coupling capacitor 20.

Figure 8:
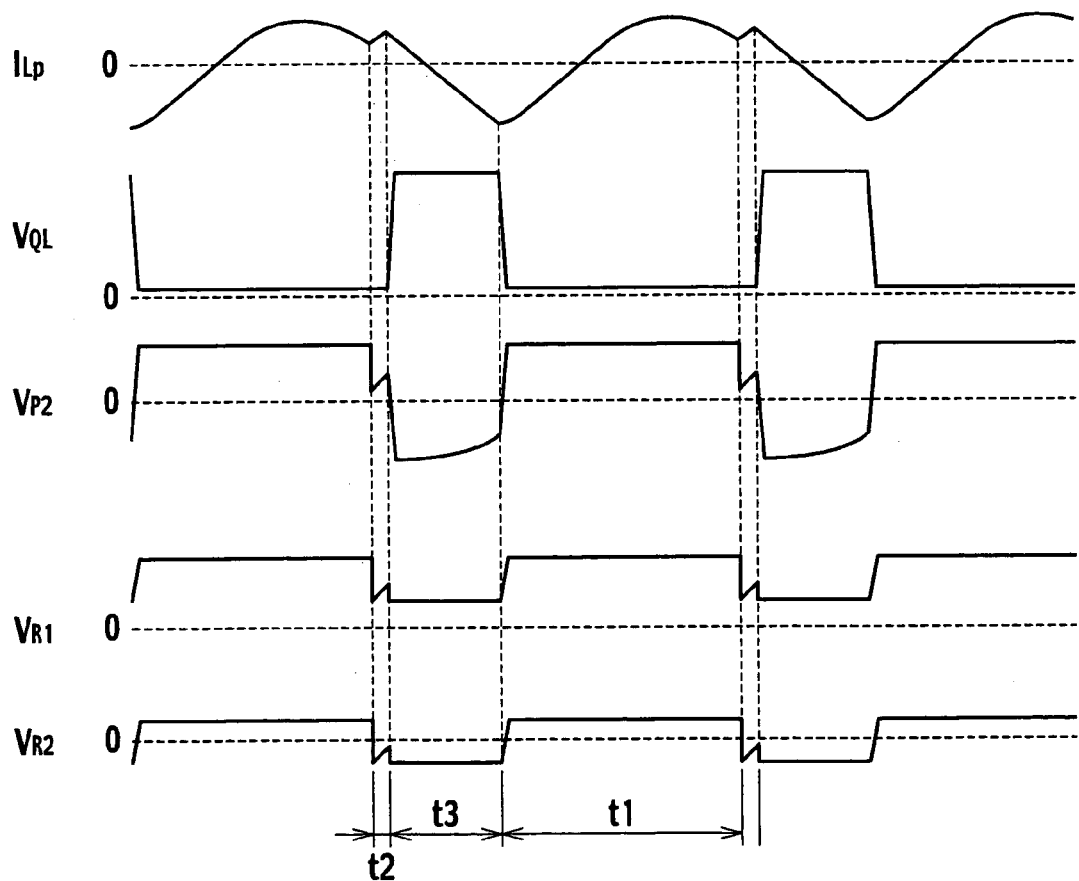
FIG. 8 is a timing chart showing signals at various parts of the resonant period detector of FIG. 7.

Operation of the resonant period detector 12 shown in FIG. 7 will be explained with reference to the timing chart of FIG. 8. In FIG. 8, ILP is a current passing through the primary winding P1 that forms the resonant circuit, VQL is a terminal voltage of the switching element QL, VP2 is a terminal voltage of the auxiliary winding P2, VR1 is a terminal voltage of the voltage detection resistor R1, and VR2 is a terminal voltage of the voltage detection resistor R2.

The voltage VP2 generated on the auxiliary winding P2 is rectified through the rectifier 19. Only a positive waveform of the rectified voltage is detected by the voltage detection resistor R1 to provide the voltage VR1. The coupling capacitor 20 and voltage detection resistor R2 extract an AC component from the voltage VR1.

The voltage VR2 thus obtained is a resonant period detection signal that shows a positive value during a resonant period t1 of energy being transmitted to the secondary side of the transformer Ta and falls as soon as the resonant period t1 ends. As shown in FIG. 8, a positive period of the voltage VR2 generated at the voltage detection resistor R2 corresponds to the period t1 in which energy is transmitted from the primary side to the secondary side of the transformer Ta.

The terminal voltage of the voltage detection resistor R2 serving as the resonant period detection signal is supplied to the pulse ratio controller 2a. In synchronization with a fall of the resonant period detection signal, the pulse ratio controller 2a turns off the switching element QL. This results in finishing the period T10 of FIG. 2 (corresponding to a period t2). Namely, the next mode is started surely after the end of the energy transmission to the secondary side of the transformer.

In a case where a leakage inductance of the primary winding P1 of the transformer Ta is employed as the resonant reactor Lr, the primary winding P1 and secondary winding S of the transformer Ta will be loosely coupled with each other. Then, the auxiliary winding P2 may be tightly coupled with the primary winding P1. In this case, the voltage of the auxiliary winding P2 will insufficiently drop to a negative side after the completion of energy transmission to the secondary side of the transformer Ta.

On the other hand, tightly coupling the auxiliary winding P2 with the secondary winding S results in surely detecting the resonant period t1 because the voltage VP2 shown in FIG. 8 surely drops when energy transmission to the secondary side of the transformer Ta terminates.

Figure 9A:
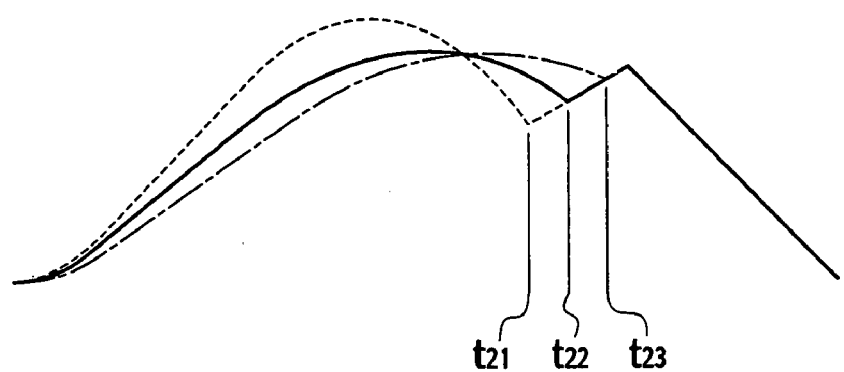
FIG. 9A is a graph showing resonant current waveforms according to a related art with a current-resonant capacitor and a resonant reactor that fluctuate.
Figure 9B:
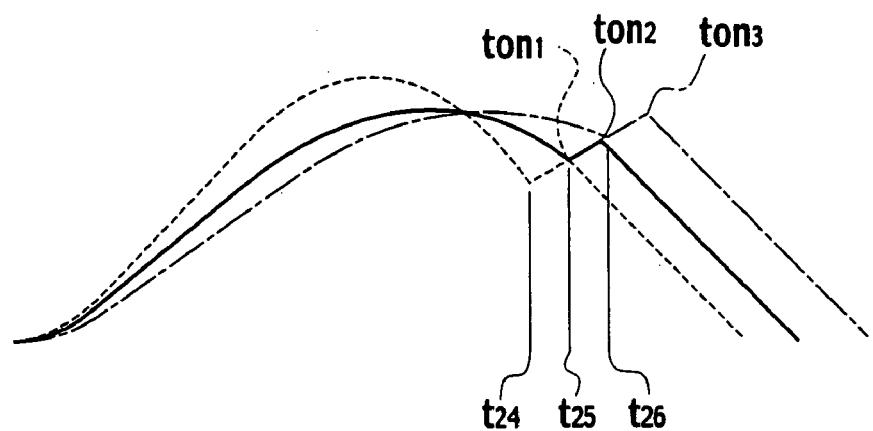
FIG. 9B is a graph showing resonant current waveforms according to the first embodiment of the present invention with a current-resonant capacitor and a resonant reactor that fluctuate.

FIGS. 9A and 9B show comparison between a related art and the first embodiment of the present invention in connection with a resonant current waveform in a case where the current-resonant capacitor and resonant reactor fluctuate. The first embodiment detects a resonant period with the use of the resonant period detector 12, and based on the detected resonant period, turns off the switching element QL. On the other hand, the related art fixes the ON period of the switching element QL. In each of the cases, the current-resonant capacitor Cri and resonant reactor Lr fluctuate, to change the resonant frequency of the resonant circuit, thereby changing the resonant current waveform. FIGS. 9A and 9B show such changes in the resonant current waveforms.

In FIG. 9A, the ON period of the switching element QL is predetermined according to the related art. As the resonant frequency changes, a period during which energy is transmitted from the primary side to the secondary side of the transformer Ta changes to t21, t22, and t23. Without regard to such changes, the ON period ton of the switching element QL is unchanged. Especially, as the resonant frequency is high, a period (for example, t21) of energy being transmitted to the secondary side of the transformer Ta is shortened to extend a period of [ton-t21] in which no energy is transmitted to the secondary side with the switching element QL being ON, thereby increasing a power loss.

FIG. 9B shows resonant current waveforms according to the first embodiment of the present invention. The resonant period detector 12 provides a resonant period detection signal representative of a resonant period that changes depending on a change in a resonant frequency. Based on the variable resonant period detection signal, the pulse ratio controller 2a determines the ON period of the switching element QL. As the resonant frequency changes, a period of energy being transmitted from the primary side to the secondary side of the transformer Ta will change to t24, t25, and t26, for example. Then, according to a change in the resonant frequency, the ON period of the switching element QL is regulated at ton1, ton2 and ton3, for example. Consequently, the first embodiment maintains a period of [ton1-t24], [ton2-t25], or [ton3-t26] in which no energy is transmitted to the secondary side at a constant value even if the resonant frequency is increased, to thereby suppress a power loss.

Second Embodiment

According to the resonant power source apparatus of the first embodiment, the auxiliary winding P2 is tightly coupled with the secondary winding S, and therefore, a resonant period detection signal from the resonant period detector 12 falls immediately at the end of a period during which energy is transmitted from the primary side to the secondary side of the transformer Ta. Due to the voltage-resonant capacitor Crv, each of the switching elements QL and QH turns on/off at a certain inclination. As a result, the resonant period detection signal rises at a certain inclination (i.e. out of plumb in a time chart which causes delay).

This inclination causes a problem of erroneously turning off the switching element QL. More precisely, upon receiving a gate signal, the switching element QL turns on to transmit energy to the secondary side of the transformer Ta. In a case where the above-mentioned inclination causes a delay in detecting the resonant period detection signal, the pulse ratio controller 2a will admit that there is no resonant period detection signal and turn off the switching element QL.

Figure 10:
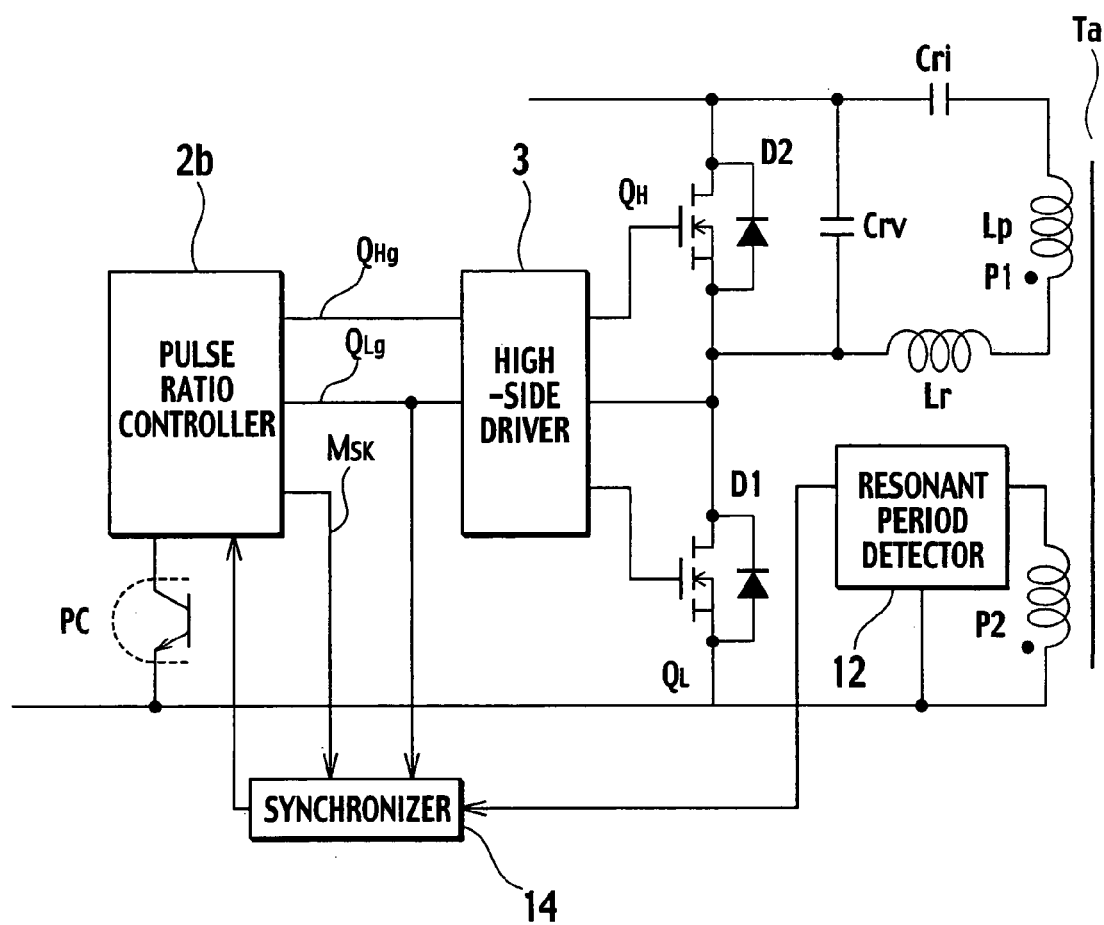
FIG. 10 is a circuit diagram partly showing a resonant power source apparatus according to a second embodiment of the present invention including a controller with a synchronizer.
Figure 11:
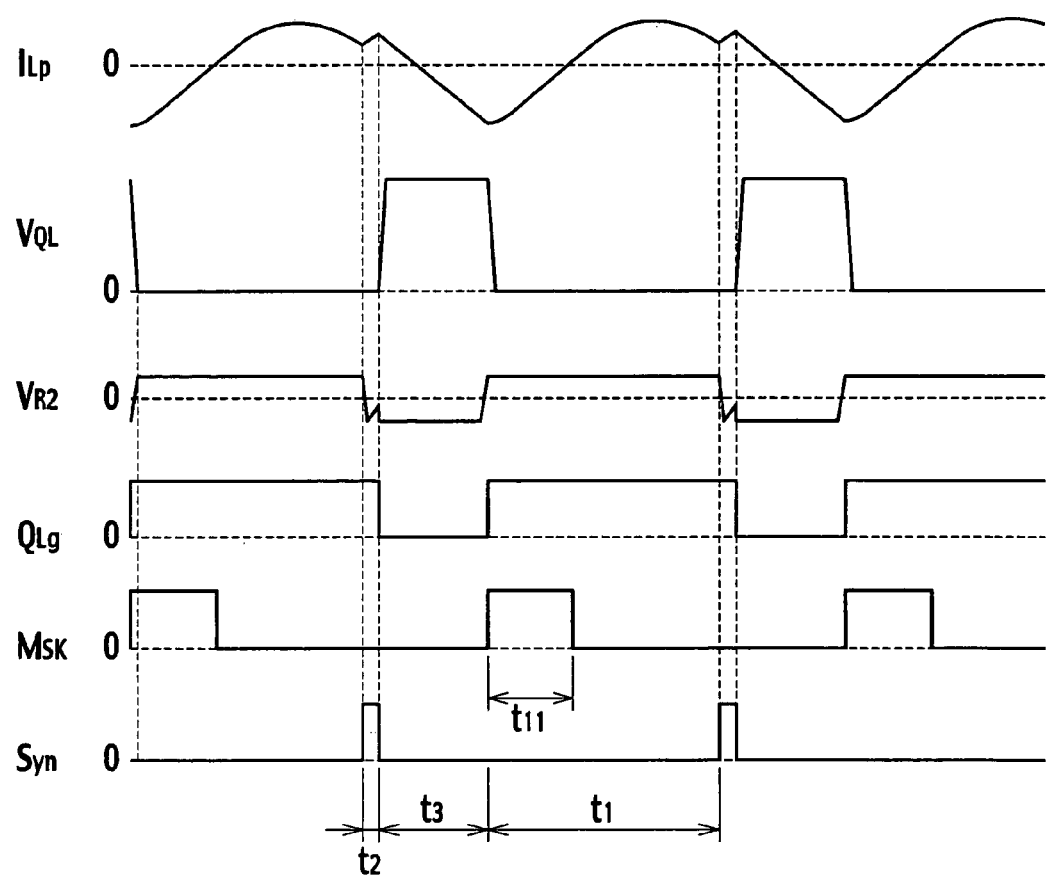
FIG. 11 is a timing chart showing signals at various parts of the resonant power source apparatus of the second embodiment.

The resonant power source apparatus of the second embodiment solves this problem, improves efficacy, and reduces noise. FIG. 10 is a circuit diagram partly showing the resonant power source apparatus of the second embodiment and FIG. 11 is a timing chart showing signals at various parts of the resonant power source apparatus of the second embodiment. In FIG. 11, ILP is a current passing through a primary winding P1 that forms a resonant circuit, VQL is a terminal voltage of a switching element QL, VR2 is a terminal voltage of a voltage detection resistor R2 provided in the resonant period detector 12, QLg is a gate signal to the switching element QL, Msk is a mask signal, and Syn is a synchronizing signal.

A pulse ratio controller 2b generates the mask signal Msk having a mast period t11 when the switching element QL is turned on, wherein a resonant period detection signal from the resonant period detector 12 is disabled during the mast period t11. The mask signal Msk is supplied to a synchronizer 14. The mask period t11 starts when the gate signal QLg to the switching element QL rises, or slightly sooner than that.

Based on the mask signal Msk from the pulse ratio controller 2b, the synchronizer 14 disables a resonant period detection signal from the resonant period detector 12 for the mask period t11 in order not to cause an erroneous operation of the switching element QL changing to OFF due to delay in detecting the resonant period detection signal which rises at a certain inclination, and therefore outputs the resonant period detection signal to the pulse ration controller 2b stably. The pulse ratio controller 2b and synchronizer 14 serve as a mask unit according to the present invention.

When the ON/OFF states of the switching elements QL and QH are switched at, for example, the start of a period t1, a voltage induced at an auxiliary winding P2 of the transformer Ta will slowly change. The slowness may cause a time delay to change the state of a resonant period detection signal from the resonant period detector 12. To compensate for the slowness, the mask unit disables the resonant period detection signal from the resonant period detector 12 for the mask period t11. As a result, even as the resonant period detection signal VR2 in FIG. 11 rises at a certain inclination which causes delay in detection thereof, an erroneous operation of the switching element QL being OFF is surely prevented by employing the mask period t11, and thus, the switching elements QL and QH can stably operate.

The ON period t1 of the switching element QL is about a half of a resonant period determined by a current-resonant capacitor Cri and a resonant reactor Lr. Accordingly, the mask period t11 may be equal to or smaller than half the resonant period t1, to realize stable control.

The resonant power source apparatus of FIG. 10 is provided with the synchronizer 14. The synchronizer 14 generates the synchronizing pulse signal Syn for a predetermined period t2 after a disappearance of the resonant period detection signal from the resonant period detector 12. The signal Syn for delaying the turning-off of the switching element QL is supplied to the pulse ratio controller 2b. The synchronizer 14 serves as a delay unit according to the present invention.

Based on the synchronizing pulse signal Syn and the resonant period detection signal, the pulse ratio controller 2b generates the gate signal QLg to turn off the switching element QL during the predetermined period t2 after a disappearance of the resonant period detection signal (upon the completion of energy transmission to the secondary side of the transformer Ta).

Delaying the turning-off of the switching element QL by the small period t2, the next mode is surely started after the completion of the period t1 of energy being transmitted to the secondary side of the transformer Ta. This results in securing and stabilizing the operation of the resonant power source apparatus.

If the switching element QL is erroneously turned on due to noise, for example, the ON state of the switching element QL will continue for the mask period t11 because a resonant period detection signal is disabled for the mask period t11. Delaying the operation of the switching element QL with the use of the synchronizing pulse signal Syn may prevent the occurrence of such an erroneous operation due to, for example, noise.

The present invention is not limited to the above-mentioned embodiments. Each of the first and second embodiments determines an ON period of the switching element QL according to a signal from the resonant period detector 12 and an ON period of the switching element QH according to a signal from the output voltage detector 5. Instead, the pulse ratio controller 2a may determine an ON period of the switching element QL according to a signal from the output voltage detector 5 and an ON period of the switching element QH according to a signal from the resonant period detector 12. This arrangement also provides the effects of the present invention.

Each of the first and second embodiments employs the DC power source 1. Instead of the DC power source, it is possible to employ an AC power source and an input rectifier for rectifying an AC voltage from the AC power source. In this case, output terminals of the input rectifier are connected to the ends of a series circuit of the switching elements QH and QL. This arrangement also provides the effects of the present invention.

Each of the first and second embodiments connects the terminals of the switching element QH to a series circuit of the current-resonant capacitor Cri, resonant reactor Lr, and the primary winding P1 of the transformer Ta. Instead, the terminals of the switching element QL may be connected to the series circuit of the current-resonant capacitor Cri, resonant reactor Lr, and the primary winding P1 of the transformer Ta.

Each of the first and second embodiments connects the terminals of the switching element QH to the voltage-resonant capacitor Crv. Instead, the terminals of the switching elements QL may be connected to the voltage-resonant capacitor Crv.

EFFECT OF THE INVENTION

According to the first technical aspect of the present invention, the resonant period detector detects a period during which energy is transmitted to the secondary side of the transformer. Based on a signal from the resonant period detector, the controller determines an ON period of the first switching element. Based on a signal from the rectifying/smoothing circuit, the controller determines an ON period of the second switching element. The ON/OFF states of the switching elements are switched after the completion of the energy transmission to the secondary side of the transformer. This configuration reduces switching noise and switching loss, improves efficacy, and decreases costs.

The resonant period detector detects a voltage of the auxiliary winding of the transformer, thereby easily detecting a resonant period.

The auxiliary winding is tightly coupled with the secondary winding of the transformer. This configuration enhances the easy detection of a resonant period.

According to the second technical aspect of the present invention, the mask unit disables a signal from the resonant period detector for a predetermined period, to realize a stable operation. More precisely, a voltage induced on the auxiliary winding of the transformer slowly changes when the ON/OFF states of the switching elements are switched. The slow voltage change causes a time delay to change the level of a signal outputted from the resonant period detector. To ignore such a level change of the signal from the resonant period detector, the mask unit disables the signal from the resonant period detector for the predetermined period, to realize a stable operation.

According to the second technical aspect, the delay unit sets a predetermined delay period after a disappearance of the signal from the resonant period detector, i.e., after the completion of energy transmission to the secondary side of the transformer. After the delay period, the ON/OFF states of the switching elements are switched to secure a correct and stable operation.

INDUSTRIAL APPLICABILITY

The present invention is applicable to switching power sources of DC-DC converters, AC-DC converters, and the like.

This application claims benefit of priority under 35USC §119 to Japanese Patent Application No. JP2005-001505, filed on Jan. 6, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A resonant power source apparatus comprising:
   a first series circuit of first and second switching elements being connected to ends of one of a DC power source and an input circuit for rectifying an AC voltage of an AC power source;
   a second series circuit of a resonant capacitor, a resonant reactor, and a primary winding of a transformer, being connected to ends of one of the first and second switching elements;
   a rectifying/smoothing circuit configured to rectify and smooth a voltage of a secondary winding of the transformer;
   a controller configured to alternately turn on/off the first and second switching elements according to an output voltage from the rectifying/smoothing circuit; and
   a resonant period detector configured to detect a period during which energy is transmitted from the primary side to the secondary side of the transformer, wherein the controller determines an ON period of the first switching element according to a signal from the resonant period detector and an ON period of the second switching element according to a signal from the rectifying/smoothing circuit.

2. The resonant power source apparatus of claim 1, wherein
   the transformer further has an auxiliary winding; and
   the resonant period detector detects the period according to a voltage of the auxiliary winding.

3. The resonant power source apparatus of claim 2, wherein the auxiliary winding is tightly coupled with the secondary winding.

4. The resonant power source apparatus of claim 1, further comprising
   a mask unit configured to disable the signal supplied from the resonant period detector to the controller for a predetermined period after one of the first and second switching elements is turned on to transmit energy from the primary side to the secondary side of the transformer.

5. The resonant power source apparatus of claim 2, further comprising:
   a mask unit configured to disable the signal supplied from the resonant period detector to the controller for a predetermined period after one of the first and second switching elements is turned on to transmit energy from the primary side to the secondary side of the transformer.

6. The resonant power source apparatus of claim 3, further comprising
   a mask unit configured to disable the signal supplied from the resonant period detector to the controller for a predetermined period after one of the first and second switching elements is turned on to transmit energy from the primary side to the secondary side of the transformer.

7. The resonant power source apparatus of claim 1, further comprising
   a delay unit configured to delay the on/off switching operation of the first and second switching elements for a predetermined period after a disappearance of the signal from the resonant period detector.

8. The resonant power source apparatus of claim 2, further comprising
   a delay unit configured to delay the on/off switching operation of the first and second switching elements for a predetermined period after a disappearance of the signal from the resonant period detector.

9. The resonant power source apparatus of claim 3, further comprising
   a delay unit configured to delay the on/off switching operation of the first and second switching elements for a predetermined period after a disappearance of the signal from the resonant period detector.

* * * * *